(12) United States Patent
Sutherland

(10) Patent No.: US 7,012,459 B2
(45) Date of Patent: Mar. 14, 2006

(54) METHOD AND APPARATUS FOR REGULATING HEAT IN AN ASYNCHRONOUS SYSTEM

(75) Inventor: Ivan E. Sutherland, Santa Monica, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/442,392

(22) Filed: May 20, 2003

(65) Prior Publication Data

US 2004/0196090 A1 Oct. 7, 2004

Related U.S. Application Data

(63) Continuation of application No. 10/406,298, filed on Apr. 2, 2003, now abandoned.

(51) Int. Cl.
*H03K 17/14* (2006.01)
*G05D 23/00* (2006.01)

(52) U.S. Cl. ............... 327/513; 327/278; 327/285; 702/132; 331/57; 331/176

(58) Field of Classification Search ............... 702/99, 702/130, 132; 327/261, 276–278, 281, 285, 327/286, 513, 288; 326/32; 365/211
See application file for complete search history.

(56) References Cited

U.S. PATENT DOCUMENTS

| | | | | |
|---|---|---|---|---|
| 4,853,654 A | * | 8/1989 | Sakurai | 331/57 |
| 5,745,375 A | * | 4/1998 | Reinhardt et al. | 700/286 |
| 6,002,991 A | * | 12/1999 | Conn, Jr. | 702/117 |
| 6,043,719 A | * | 3/2000 | Lin et al. | 331/57 |
| 6,047,248 A | * | 4/2000 | Georgiou et al. | 702/132 |
| 6,078,209 A | * | 6/2000 | Linoff | 327/513 |
| 6,268,753 B1 | * | 7/2001 | Sandusky | 327/266 |
| 6,310,928 B1 | * | 10/2001 | Yunome | 375/376 |
| 6,363,490 B1 | * | 3/2002 | Senyk | 713/300 |
| 6,404,690 B1 | * | 6/2002 | Johnson et al. | 365/222 |
| 6,415,388 B1 | * | 7/2002 | Browning et al. | 713/322 |
| 6,885,233 B1 | * | 4/2005 | Huard et al. | 327/513 |
| 6,908,227 B1 | * | 6/2005 | Rusu et al. | 374/141 |
| 2004/0108521 A1 | * | 6/2004 | Lim et al. | 257/200 |
| 2004/0135643 A1 | * | 7/2004 | Clabes et al. | 331/57 |

\* cited by examiner

*Primary Examiner*—Timothy P. Callahan
*Assistant Examiner*—Terry L. Englund
(74) *Attorney, Agent, or Firm*—Park, Vaughan & Fleming, LLP

(57) ABSTRACT

One embodiment of the present invention provides a system that regulates heat within an asynchronous circuit. During operation, the system monitors a temperature within the asynchronous circuit. If the temperature exceeds a threshold value, the system introduces a delay into the asynchronous circuit that causes signals to propagate more slowly through the asynchronous circuit. This causes circuit elements within the asynchronous circuit to switch less frequently and consequently causes the circuit elements to generate less heat.

19 Claims, 3 Drawing Sheets

METHOD AND APPARATUS FOR REGULATING HEAT IN AN ASYNCHRONOUS SYSTEM

This application is a continuation of, and hereby claims priority under 35 U.S.C. § 120 to, abandoned U.S. patent application Ser. No. 10/406,298, filed Apr. 02, 2003, entitled "Method and System for Regulating Heat in an Asynchronous System" by inventor Ivan B. Sutherland.

BACKGROUND

1. Field of the Invention

The present invention relates to the design of systems that regulate the buildup of heat within electrical circuitry. More specifically, the present invention relates to a method and an apparatus for regulating the buildup of heat within an asynchronous circuit.

2. Related Art

The dramatic increases in computational speed in recent years have largely been facilitated by improvements in semiconductor integration densities, which presently allow hundreds of millions of transistors to be integrated into a single semiconductor chip. This makes it possible to incorporate a large amount of computational circuitry onto a semiconductor chip. Moreover, the small circuit dimensions made possible by improved integration densities enables this computational circuitry to operate at extremely high speed.

However, as computational operations are performed more rapidly and involve increasingly larger amounts of computational circuitry, it is becoming progressively harder to synchronize computational operations with reference to a single global clock signal. In many cases, enforcing such synchronization greatly constrains the performance of the computational circuitry. To remedy this problem, some designers have begun to investigate the possibility of using "asynchronous" circuits that do not operate with reference to a global clock signal, and are hence not constrained by the need to continually synchronize computational operations with the global clock signal. In many cases, such asynchronous circuits can increase computational speed by an order of magnitude or more.

However, increasing the computational speed of an asynchronous circuit causes the circuit to switch more frequently. This increases power consumption and consequently generates a significant amount of heat. Computing systems typically employ various components to dissipate this heat, such as heat sinks and cooling fans. However, as the computational speed of semiconductor chips continues to increase, and as these chips are packed more closely together to minimize propagation delay between the chips, it is becoming progressively harder to effectively dissipate this heat. This leads to excessive heat buildup, which can cause a computer system to fail, and in some cases can permanently damage circuitry within the computer system.

What is needed is a method and an apparatus that effectively regulates heat generated by a high-speed asynchronous circuit.

SUMMARY

One embodiment of the present invention provides a system that regulates heat within an asynchronous circuit. During operation, the system monitors a temperature within the asynchronous circuit. If the temperature exceeds a threshold value, the system introduces a delay into the asynchronous circuit that causes signals to propagate more slowly through the asynchronous circuit. This causes circuit elements within the asynchronous circuit to switch less frequently and consequently causes the circuit elements to generate less heat.

In a variation on this embodiment, introducing the delay into the asynchronous circuit involves introducing the delay into at least one asynchronous circuit element. In a further variation, the asynchronous circuit element is a logic gate with a voltage-controlled delay. In a yet a further variation, this logic gate comprises an inverter with a voltage-controlled degeneration transistor that introduces a voltage-controlled propagation delay into the inverter.

In a variation on this embodiment, introducing the delay into the asynchronous circuit involves introducing the delay into at least one asynchronous signal line within the asynchronous circuit. In a further variation, introducing the delay into an asynchronous signal line involves selectively switching the asynchronous signal line through chains of inverters having differing lengths to introduce different delays into the asynchronous signal line.

In a variation on this embodiment, introducing the delay into the asynchronous circuit involves introducing the delay into an asynchronous control circuit that asynchronously controls propagation of data through the asynchronous circuit.

In a variation on this embodiment, if the temperature exceeds the threshold value, the system additionally reduces a voltage supplied to the asynchronous circuit. This reduces the power consumed by the asynchronous circuit and consequently causes the asynchronous circuit to generate less heat.

In a further variation, if the temperature exceeds the threshold value, the voltage is reduced first, and if reducing the voltage does not reduce the temperature below the threshold value, the delay is introduced.

In a variation on this embodiment, the asynchronous circuit resides within a computer system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Temperature Regulation System

Figure 1:
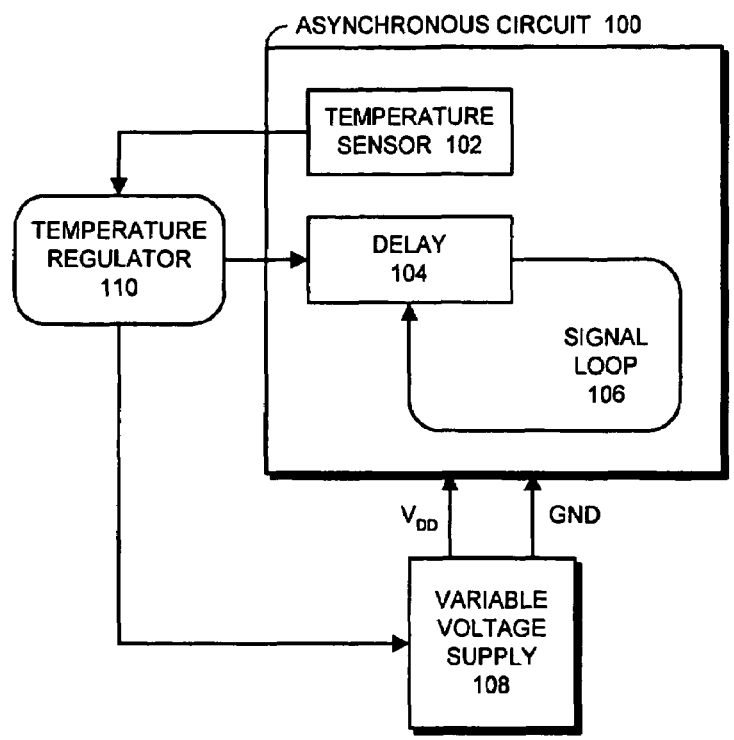
FIG. 1 illustrates a temperature regulation system for an asynchronous circuit in accordance with an embodiment of the present invention.

FIG. 1 illustrates a temperature regulation system for an asynchronous circuit 100 in accordance with an embodiment of the present invention. The asynchronous circuit illustrated in FIG. 1 can generally include any type of circuit that does not synchronize computational operations and data movement operations with reference to a system clock. In one embodiment of the present invention, asynchronous circuit 100 is a part of a computer system.

The system illustrated in FIG. 1 includes a temperature regulator 110. Temperature regulator 110 receives a temperature measurement from a temperature sensor 102, which is thermally coupled to asynchronous circuit 100. If this temperature measurement indicates that asynchronous circuit 100 is too hot (or is becoming too hot), temperature regulator 110 takes steps to reduce the heat being generated by asynchronous circuit 100. For example, temperature regulator 110 can cause variable voltage supply 108 to reduce the voltage provided to asynchronous circuit 100. This reduces the power consumed by asynchronous circuit 100, and thereby reduces the heat being generated by asynchronous circuit 100.

Temperature regulator 110 can also introduce delay 104 into a signal loop 106 within asynchronous circuit 100. This increases the round trip propagation delay through signal loop 106, and thereby decreases the speed with which asynchronous circuit 100 operates. Decreasing the operating speed of asynchronous circuit 100 also decreases the power consumed by asynchronous circuit 100, and similarly reduces the heat being generated by asynchronous circuit 100.

Asynchronous Circuit with Variable Delay Element

Figure 2:
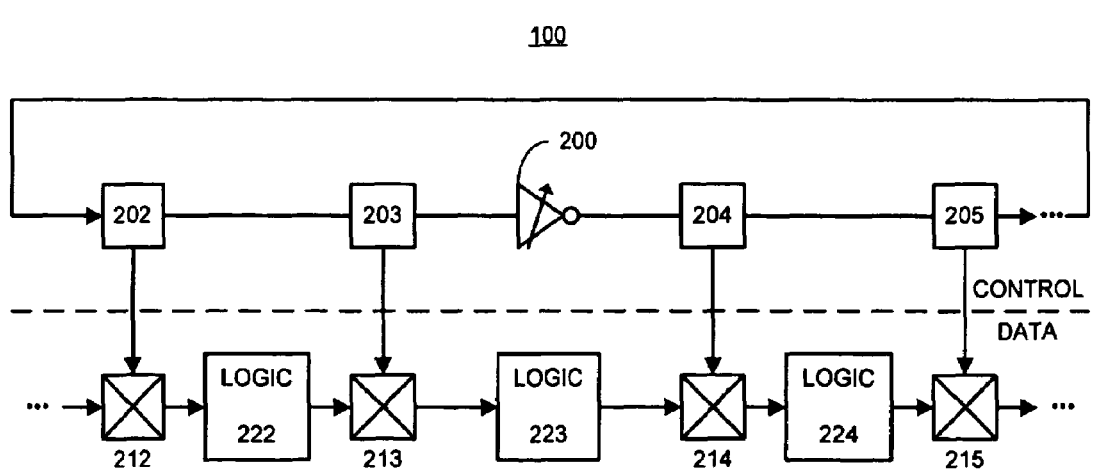
FIG. 2 illustrates how a variable delay element is incorporated into an asynchronous circuit in accordance with an embodiment of the present invention.

FIG. 2 illustrates how a variable delay element 200 is incorporated into an asynchronous circuit 100 in accordance with an embodiment of the present invention. In this embodiment, variable delay element 200 is located within a control portion of asynchronous circuit 100. This control portion includes a number of asynchronous control elements 202–205. During operation, tokens pass between control elements 202–205. These tokens cause pass gates (or switches) 212–215 to be activated, which allow signals to flow through logic circuitry 222–224.

Variable delay element 200 is located between control elements 203 and 204, and introduces a delay into a signal loop that passes through control elements 202–205 as is illustrated in FIG. 2. This causes the round trip delay through the signal loop to be selectively increased, thereby decreasing the speed at which asynchronous circuit 100 operates. Note that in general there can be numerous delay elements within asynchronous circuit 100.

Also note that instead of inserting a delay element into asynchronous circuit 100, it is also possible to modify an existing circuit element within asynchronous circuit 100 to produce a variable delay through the circuit element.

Variable Delay Element

Figure 3A:
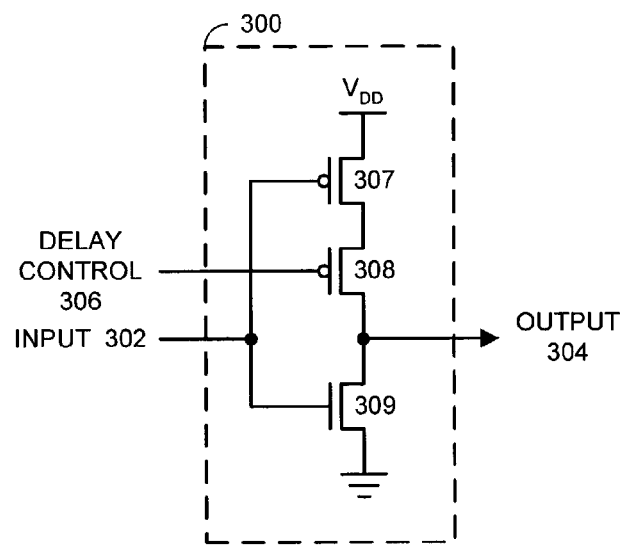
FIG. 3A illustrates the design of a variable delay element in accordance with an embodiment of the present invention.

Variable delay element 200 can generally include any type of circuit that can be selectively adjusted to produce a variable delay. For example, FIG. 3A illustrates the design of a variable delay element based on an inverter 300 in accordance with an embodiment of the present invention. Inverter 300 is similar to a standard CMOS inverter and includes both a P-type pullup transistor 307 and an N-type pulldown transistor 309, which collectively cause input 302 to be inverted to produce output 304.

However, unlike a standard CMOS inverter, inverter 300 also includes a P-type "degeneration transistor" 308, coupled between P-type transistor 307 and output 304. An analog voltage delay control signal 306 feeds into the gate input of degeneration transistor 308, so that the voltage of control signal 306 controls that amount of current that can flow through degeneration transistor 308. Note that a higher analog voltage on delay control signal 306 starves the pullup action and consequently increases latency through inverter 300.

Figure 3B:
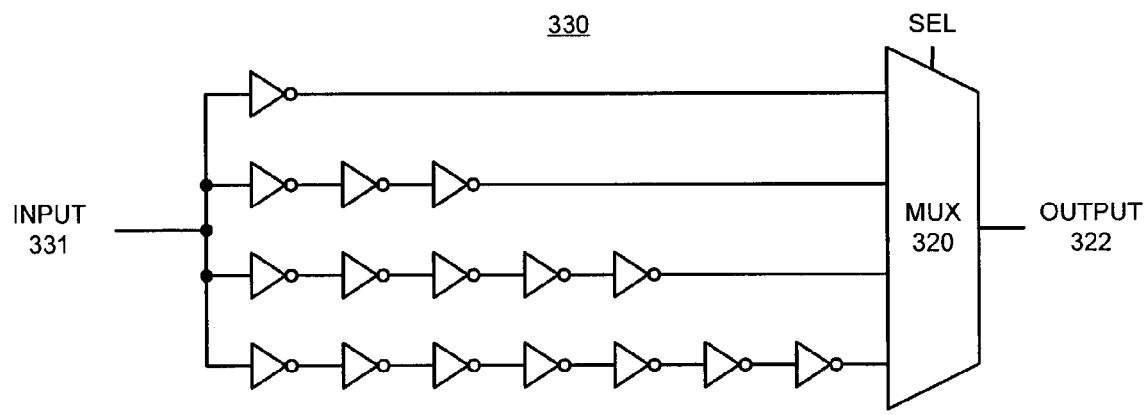
FIG. 3B illustrates the design of another variable delay element in accordance with an embodiment of the present invention.

FIG. 3B illustrates another type of variable delay element 330 in accordance with an embodiment of the present invention. This variable delay element 330 includes several chains of inverters that are coupled to input 331. The outputs of these chains of inverters feed into a multiplexer 320, which selects between the outputs of the chains of inverters, and thereby selects between different propagation delays. Multiplexer 320 passes the signal from the selected chain of inverters to output 322.

Process of Regulating Temperature

Figure 4:
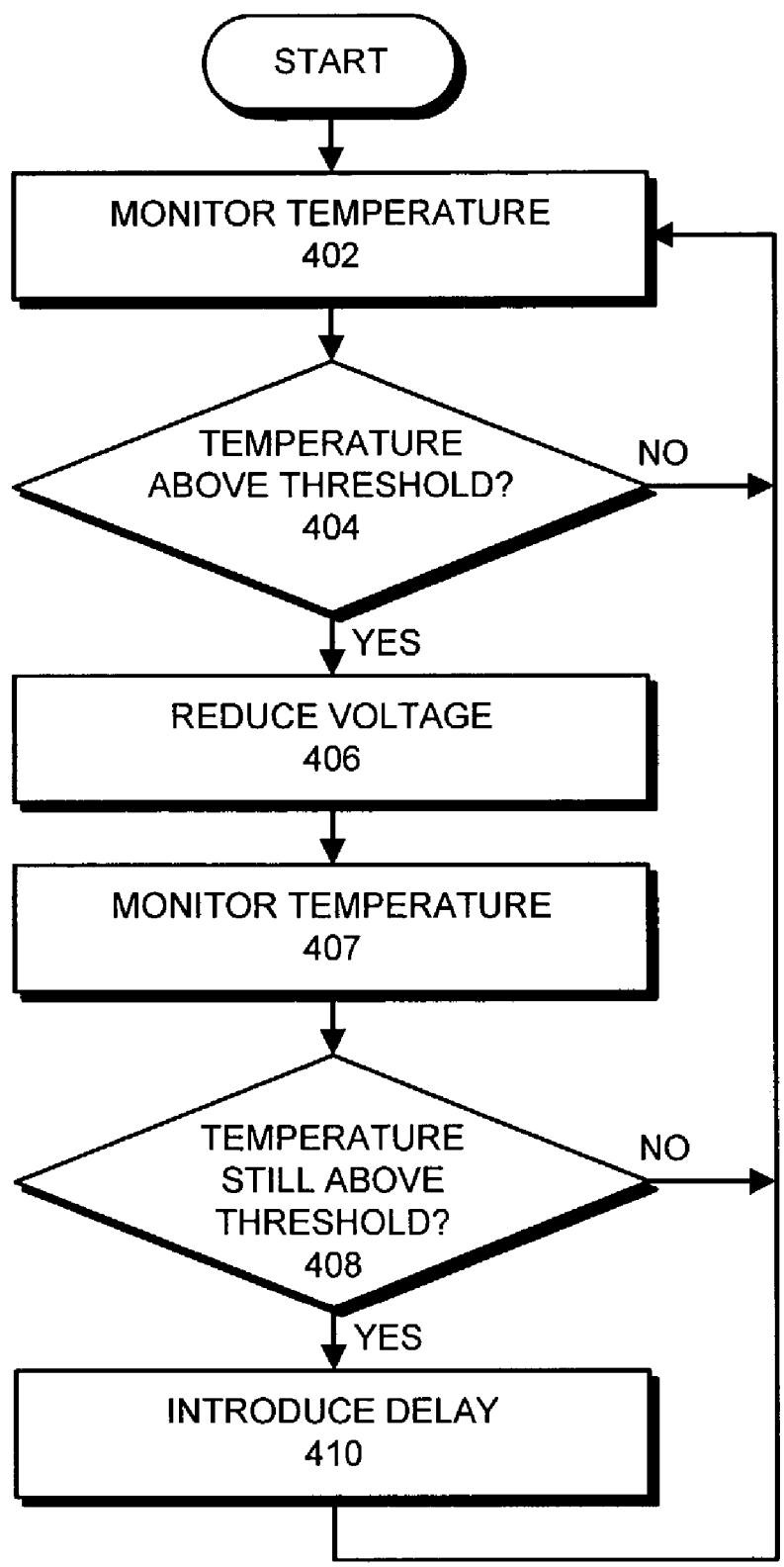
FIG. 4 presents a flow chart illustrating how temperature is regulated in an asynchronous circuit in accordance with an embodiment of the present invention.

FIG. 4 presents a flow chart illustrating how temperature can be regulated in an asynchronous circuit in accordance with an embodiment of the present invention. During operation, the system monitors the temperature of the asynchronous circuit (step 402). The system then determines if the temperature is above the threshold value (step 404). If not, the system returns to step 402 to continue monitoring the temperature.

Otherwise, the system reduces the voltage applied to asynchronous circuit (step 406), and continues to monitor the temperature (step 407). After a certain period of time, the system again determines if the temperature is above the threshold value (step 408). If not, the system returns to step 402 to continue monitoring the temperature. Otherwise, if the temperature is still greater than the threshold value, the system introduces a delay into the asynchronous circuit (step 410) to further reduce the temperature of the asynchronous circuit. The system then returns to step 402 to continue monitoring the temperature.

Note that if the temperature drops below the threshold value after the voltage has been reduced, the voltage can be restored to its original value. Similarly, if the temperature drops below the threshold value after the delay has been introduced, the delay can be removed from the asynchronous circuit.

Also note that many variations of this process are possible. It is possible to introduce the delay first, before reducing the voltage. It is also possible to only reduce the voltage, and not introduce the delay. It is similarly possible to only introduce the delay, and not adjust the voltage.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for regulating heat within an asynchronous circuit, comprising:
   monitoring a temperature within the asynchronous circuit; and if the temperature exceeds a threshold value:
  introducing a delay into a control signal path signal loop within the asynchronous circuit that causes tokens traversing the control signal path signal loop to propagate more slowly around the control signal path signal loop, thereby causing circuit elements within the asynchronous circuit to switch less frequently and consequently causing the circuit elements to generate less heat, and
  reducing a voltage supplied to the asynchronous circuit to reduce the power consumed by the asynchronous circuit and to consequently cause the asynchronous circuit to generate less heat.

2. The method of claim 1, wherein introducing the delay into the control signal path signal loop within the asynchronous circuit involves introducing the delay into at least one asynchronous circuit element within the control signal path signal loop.

3. The method of claim 2, wherein introducing the delay into at least one asynchronous circuit element involves introducing the delay into a logic gate with a voltage-controlled delay.

4. The method of claim 3, wherein the logic gate with the voltage-controlled delay comprises an inverter with a voltage-controlled degeneration transistor that introduces a voltage-controlled propagation delay into the inverter.

5. The method of claim 1, wherein introducing the delay into the control signal path signal loop within the asynchronous circuit involves introducing the delay into at least one asynchronous signal line within the control signal path signal loop.

6. The method of claim 5, wherein introducing the delay into an asynchronous signal line involves selectively switching the asynchronous signal line through chains of inverters having differing lengths to introduce different delays into the asynchronous signal line.

7. The method of claim 1, wherein introducing the delay into the asynchronous circuit involves introducing the delay into an asynchronous control circuit that asynchronously controls propagation of data through the asynchronous circuit.

8. The method of claim 1, wherein if the temperature exceeds the threshold value, the voltage is reduced first, and if reducing the voltage does not reduce the temperature below the threshold value, then the delay is introduced.

9. The method of claim 1, wherein the asynchronous circuit resides within a computer system.

10. An apparatus that regulates heat within an asynchronous circuit, comprising:
  a monitoring mechanism that monitors a temperature within the asynchronous circuit;
  a delay mechanism, wherein if the temperature exceeds a threshold value, the delay mechanism introduces a delay into a control signal path signal loop within the asynchronous circuit that causes tokens traversing the control signal path signal loop to propagate more slowly around the control signal path signal loop, thereby causing circuit elements within the asynchronous circuit to switch less frequently and consequently causing the circuit elements to generate less heat; and
  a voltage reduction mechanism, wherein if the temperature exceeds the threshold value, the voltage reduction mechanism is configured to reduce a voltage supplied to the asynchronous circuit to reduce the power consumed by the asynchronous circuit and to consequently cause the asynchronous circuit to generate less heat.

11. The apparatus of claim 10, wherein the delay mechanism is configured to introduce the delay into at least one asynchronous circuit element within the control signal path signal loop.

12. The apparatus of claim 11, wherein the at least one asynchronous circuit element includes a logic gate with a voltage-controlled delay.

13. The apparatus of claim 12, wherein the logic gate with the voltage-controlled delay comprises an inverter with a voltage-controlled degeneration transistor that introduces a voltage-controlled propagation delay into the inverter.

14. The apparatus of claim 10, wherein the delay mechanism is configured to introduce the delay into at least one asynchronous signal line within the control signal path signal loop.

15. The apparatus of claim 14, wherein the delay mechanism is configured to selectively switch the at least one asynchronous signal line through chains of inverters having differing lengths to introduce different delays into the at least one asynchronous signal line.

16. The apparatus of claim 10, wherein the delay mechanism is configured to introduce the delay into an asynchronous control circuit that asynchronously controls propagation of data through the asynchronous circuit.

17. The apparatus of claim 10, wherein if the temperature exceeds the threshold value, the voltage reduction mechanism is configured to reduce the voltage, and if reducing the voltage does not reduce the temperature below the threshold value, the delay mechanism is configured to introduce the delay into the asynchronous circuit.

18. The apparatus of claim 10, wherein the asynchronous circuit resides within a computer system.

19. A computer system including an asynchronous circuit, comprising:
  a processor;
  a memory;
  the asynchronous circuit located within the processor and/or within the memory;
  a monitoring mechanism that monitors a temperature within the asynchronous circuit;
  a delay mechanism, wherein if the temperature exceeds a threshold value, the delay mechanism introduces a delay into a control signal path signal loop within the asynchronous circuit that causes tokens traversing the control signal path signal loop to propagate more slowly around the control signal path signal loop, thereby causing circuit elements within the asynchronous circuit to switch less frequently and consequently causing the circuit elements to generate less heat; and
  a voltage reduction mechanism, wherein if the temperature exceeds the threshold value, the voltage reduction mechanism is configured to reduce a voltage supplied to the asynchronous circuit to reduce the power consumed by the asynchronous circuit and to consequently cause the asynchronous circuit to generate less heat.

* * * * *